United States Patent [19]
Jaquette et al.

[11] Patent Number: 6,009,547
[45] Date of Patent: Dec. 28, 1999

[54] ECC IN MEMORY ARRAYS HAVING SUBSEQUENT INSERTION OF CONTENT

[75] Inventors: Glen Alan Jaquette; Gordon Leon Washburn, both of Tucson, Ariz.

[73] Assignee: International Business Machines Corporation, Armonk, N.Y.

[21] Appl. No.: 08/984,066

[22] Filed: Dec. 3, 1997

[51] Int. Cl.[6] .................................................. G11C 29/00
[52] U.S. Cl. .......................... 714/758; 395/872; 714/773
[58] Field of Search .................................... 714/763, 769, 714/773, 784, 758; 395/872

[56] References Cited

U.S. PATENT DOCUMENTS

| | | | |
|---|---|---|---|
| 4,930,129 | 5/1990 | Takahira | 371/40.4 |
| 5,099,484 | 3/1992 | Smelser | 371/38.1 |
| 5,280,601 | 1/1994 | Desai et al. | 395/425 |
| 5,414,720 | 5/1995 | Kadokawa | 371/40.4 |
| 5,465,260 | 11/1995 | Zook | 371/37.1 |
| 5,465,338 | 11/1995 | Clay | 395/310 |
| 5,465,343 | 11/1995 | Henson et al. | 395/439 |
| 5,469,451 | 11/1995 | Henmi | 371/40.4 |
| 5,583,876 | 12/1996 | Kakuta | 371/40.4 |

*Primary Examiner*—Stephen M. Baker
*Attorney, Agent, or Firm*—John H. Holcombe; Robert M. Sullivan

[57] ABSTRACT

Disclosed is a memory array system, such as a DRAM, for the temporary storage of data. ECC check symbols for insuring the correctness of the data are written to a different segment of the memory array from the data. The data is formatted into blocks of length (l), directly related to the standard sized access width of the memory array, and gap blocks of length (l) are inserted into the data stream for subsequent substitution of headers. The data and associated headers may have appended check symbols calculated with a Reed-Solomon generator polynomial. The data blocks are written into memory partitions with an exact alignment of blocks with partition boundaries, so that no gap block spans a partition boundary. ECC encoding logic calculates the ECC check symbols, employing an identical Reed-Solomon generator polynomial for each partition. The headers with the associated CRC are subsequently substituted for the gap blocks. By use of identical polynomials in the headers and the ECC covering the partitions, and by having the system insure that no gap (left for a header to be written later) spans a partition boundary, no net contribution to the ECC is made by the first Reed-Solomon check symbols.

33 Claims, 3 Drawing Sheets

CRC GENERATION AND CHECKING CIRCUIT
$G(X)=1+\alpha^{201}X+\alpha^{246}X^2+\alpha^{201}X^3+X^4$

ECC IN MEMORY ARRAYS HAVING SUBSEQUENT INSERTION OF CONTENT

TECHNICAL FIELD

This invention relates to error detection and correction in memory arrays, and, more particularly, to the storage of data together with associated Reed-Solomon ECC in memory arrays in a convenient and low cost manner, where the data initially stored is followed by the insertion of added content.

BACKGROUND OF THE INVENTION

Memory arrays, such as semiconductor dynamic random access memory arrays, hereinafter "DRAM", are typically available in certain standard sizes of access width, such as 16 bits (2 bytes) wide.

The data stored in such memory arrays is used for many purposes. One example is the temporary storage of data as it is transferred between a host computer system and a data storage system, such as magnetic tape or optical disk data storage systems.

It is critical that the temporarily stored data be transferred at high speed, without stopping, and be correct, without errors, when transferred.

When data is stored on magnetic tape or optical disk, it may be archived for a time such that the original source of the data updates or alters the originating information in the meantime. If, as is typical, the magnetic tape or optical disk is employed as Backup, the user is likely to access the Backup data because the primary storage has failed and the user is trying to rebuild it. Thus, should the stored data have uncorrectable errors which cannot be ascertained from the context, and the original data is lost, there is no way to rebuild the data.

The magnetic tape or optical disk is a moving medium, such that no convenient opportunity exists to stop, or interrupt, the transfer of the data for retransfer thereof.

As the result, it is important to employ a memory array system which has an error correction and detection capability. As pointed out by U.S. Pat. No. 5,099,484, Smelser, filed Jun. 9, 1989, the increase in RAM chip densities and the movement to ever larger dynamic RAM's has resulted in failure mechanisms that can result in multiple bits in error, which are not correctable by most Hamming codes once used for RAM memory arrays. Smelser proposes the use of Reed-Solomon error correcting codes to provide check symbols stored with the data for multibit error detection and correction. To store the data symbols together with the check symbols is workable in the context of a CPU memory but does not take into account the need for altering the memory content for headers during the transfer of records to data storage, as will be explained.

Another approach, such as that illustrated in U.S. Pat. No. 5,469,451, Henmi, filed Nov. 23, 1994, is to employ separate memory arrays for the data and for the error correcting symbols (separate PROMS are illustrated). The data handling for separate arrays allows the memory addresses to be checked also, but suffers the same problem as above for adding headers to the data subsequent to the temporary storage of the data.

As described above, the inability to locate the original data to substitute for any erroneous uncorrectable data stored on magnetic tape or optical disk requires that the stored data itself have at least an error detection capability. Certain standards of error detection capability have been defined as parts of the data storage file formats. For example, the IBM 3494 Data Storage Library file format employs a 4 byte cyclic redundancy check (CRC) for all data files, which typically are compressed. Thus, the data temporarily stored by the memory array will also have appended CRC information.

Data or information to be stored on data storage media such as optical disk or on magnetic tape requires the addition of headers or information identifying and defining the data or information and its method of recording (e.g., the compression code) so that it can be identified and, hopefully, read at a later date. Conventionally, such headers are of a defined length shorter than the typical record, and often, have their own Reed-Solomon error detecting cyclic redundancy code, CRC. Therefore, typically, the headers are generated separately from the data to be recorded and stored in a special "header" memory array system for entry into the recording medium prior to the associated data file. The special "header" memory array system once again requires error correction which may duplicate the data memory array system.

The above standards of data storage file formats include definitions of the headers and the error detection capability for the headers, as well. For example, the IBM 3494 Data Storage Library file format has a 96 byte device block header, which is composed of three separate 32 byte fields, each of which includes as its last 4 bytes the cyclic redundancy check (CRC) bytes of the 28 bytes of header data which precede it. The device block header may be for one or for a sequence of data files. Next is a file header of 32 bytes, which again comprises 28 bytes of header data and 4 bytes which are the CRC of the header data. Next would be the compressed data file, which is padded, if necessary, to make it some multiple of 32 bytes in length. As described above, the last 4 bytes of any data file is the CRC on the data which precedes it. The CRC for the data and the headers is calculated by a Reed-Solomon polynomial.

However, the headers are typically supplied separately from the data.

Thus, the typical data memory system for a data storage system may comprise separate header and data memory array systems. The headers will have a CRC generator employing one Reed-Solomon code, a memory array system with ECC generation for headers requiring separate memory arrays for the ECC and for the header which includes the CRC. The data will have another CRC generator for generating the CRC for the data to be stored, and another memory array system with ECC generation for the data requiring separate memory arrays for the ECC and for the data which includes the CRC. The resultant system is duplicative and not cost efficient. Alternatively, the header information may employ special circuitry which does not require a memory array, but will generate the CRC, but which must be highly accurate or have an equivalent to the memory array ECC for assuring accuracy. Such specialized circuitry may require a custom circuit with a corresponding "custom" price and will not be cost efficient.

SUMMARY OF THE INVENTION

An object of the present invention is to reduce the complexity and the cost of the memory array systems which provide temporary storage of data and subsequently supplied headers as they are transferred between a host computer system and a data storage system, such as magnetic tape or optical disk data storage systems.

Another object of the present invention is to reduce the complexity and cost of data storage memory systems which have ECC capability.

Disclosed is a memory system that employs a memory array having a predefined access width (w), which is a standard width. Data is received at an input for temporary storage in the memory system, possibly for transfer between a host computer system and a data storage system, such as magnetic tape or optical disk data storage systems. The data may have appended first check symbols calculated with a Reed-Solomon generator polynomial. The data is formatted in a block format, each block of length (l) directly related to the predefined access width (w).

The received data may comprise at least one data file, and at least one header is subsequently appended thereto in the memory system by the microcode. The header is also arranged in the block format, and includes appended check symbols.

In accordance with the present invention, gap blocks of the formatted size are added to the formatted data at the locations where the headers will be added. The formatted gap and data blocks are sequentially stored in the memory module, beginning at partition boundaries, and arranged so that no gap block spans a partition boundary. To accomplish the arrangement, any otherwise odd length blocks, such as at the end of a record, are padded so as to be expanded to a full block.

ECC encoding logic is provided for calculating ECC check symbols for the block format data. The ECC encoding logic employs an identical Reed-Solomon generator polynomial as the data and the header check symbols. The ECC encoding logic calculates the ECC check symbols separately for each partition. The length of the partition (k) equals the multiple times the block length (m)*(l).

The headers may subsequently be inserted into the spaces represented by the gap blocks. By insuring that no gap block spans a partition boundary, and by employing identical polynomials for the header blocks and the ECC, the substitution of the header for the gap blocks results in no net contribution to the ECC. Thus, when read out and the ECC checked, the data and appended headers will be detected as needed and correction enabled by the ECC.

For a fuller understanding of the present invention, reference should be made to the following detailed description taken in conjunction with the accompanying drawings.

DETAILED DESCRIPTION OF THE INVENTION

Data stored in memory arrays, such as DRAM, is used for many purposes. As described above, one example is the temporary storage of data as it is transferred between a host computer system and a data storage system, such as magnetic tape or optical disk data storage systems.

When employed for a data storage system, it is critical that the temporarily stored data be transferred at high speed, without stopping, because the magnetic tape or optical disk is a moving medium, such that no convenient opportunity exists to stop, or interrupt, the transfer of the data for retransfer thereof. It is also critical that the temporarily stored data be correct, without errors, when transferred, because there is often no opportunity to locate the original data to substitute for any erroneous data.

Figure 1:
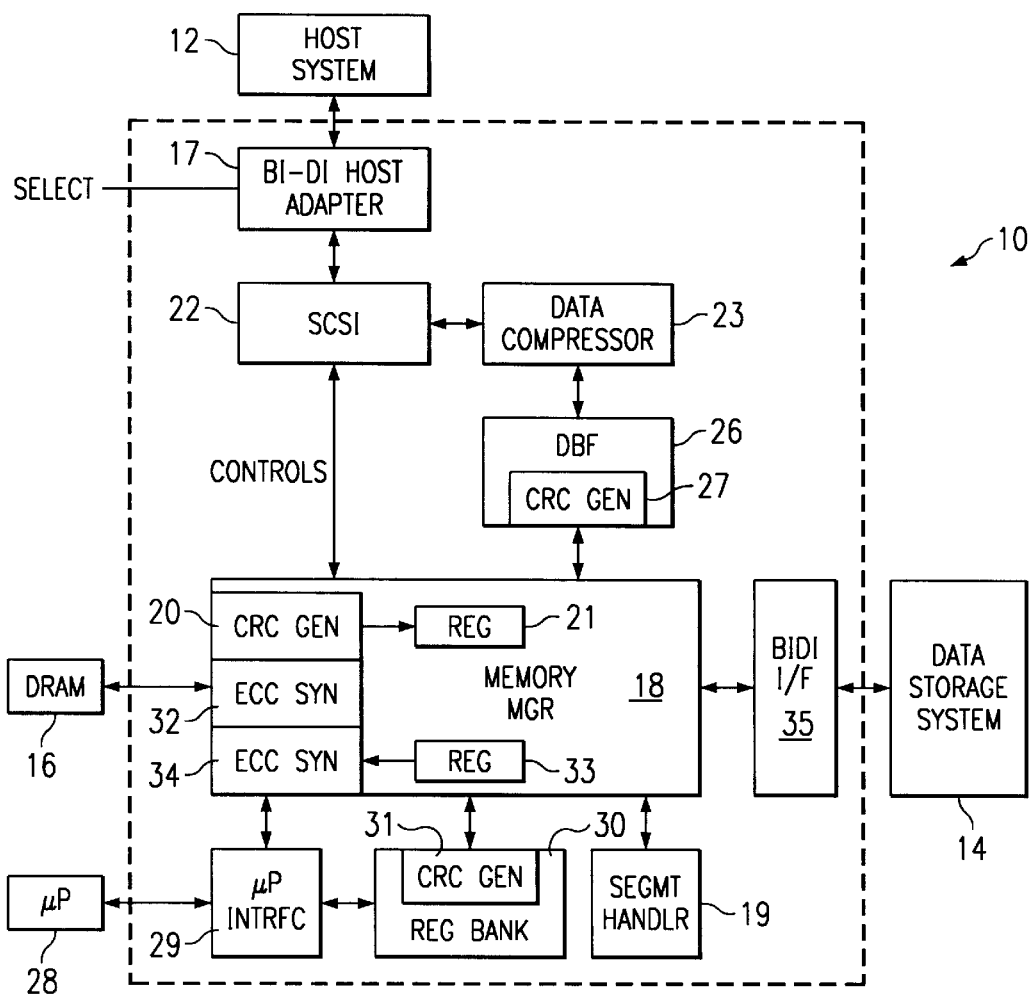
FIG. 1 is a block diagram of a memory system of the present invention.

Referring to FIG. 1, one embodiment of a memory system 10 is shown in accordance with the present invention, which, for example, may provide the temporary storage of data as it is transferred between a host computer system 12 and a data storage system 14, such as magnetic tape or optical disk data storage systems.

The memory system 10 provides the same level of data integrity as described in the background, but at a much lower system cost. A single memory array 16, such as a DRAM, is employed to temporarily store both the data and the associated ECC. The memory array 16 comprises standard modules having a conventional multibyte access width (w), such as 4 bytes, or 32 bits.

Rather than supply ECC bits to a separate DRAM, byte level ECC check symbols are written to a different memory segment of the memory array 16 by memory manager 18 and segment handler 19. The ECC check symbols are calculated by a CRC generator 20, supplied to register 21, and written to the different segment of the memory array 16.

The data supplied to the memory array 16 is typically compressed and formatted into blocks. For example, in a standard format for the IBM 3494 Data Storage Library, the data is compressed and formatted into blocks of 32 bytes. In the embodiment illustrated in FIG. 1, the data is supplied to the memory system from a host system 18 at conventional bi-directional host adapter interface 17. Conventional SCSI ("small computer systems interface") controller 22 supplies the data to a data compressor 23, and then, to a data block formatter 26. The data compressor 23 compresses the data and the data block formatter 26 typically first adds a CRC to the compressed data file and then formats the data file. CRC generator 27 adds CRC's to the data, typically adding a 4 byte Reed-Solomon CRC to each data file. The CRC is sufficient to allow detection of an error in the data file, but is insufficient to allow correction of the data. The data block formatter then formats the compressed data into blocks of 32 bytes.

In accordance with the present invention, the last block of the compressed data is padded, if necessary, to make it exactly 32 bytes in length after the CRC is appended. As will be explained, by expanding the block to 32 bytes, it will insure that subsequent blocks will be properly aligned.

Data received from the data storage system 14 will have been similarly compressed, CRC's added, and formatted.

The blocks of the data file are supplied to memory manager 18 and byte level ECC check symbols are calculated by CRC generator 20 for a plurality of the blocks, specifically a multiple number (m) of the blocks. The sequence of blocks may be termed a partition, so that the length of the partition (k) equals the multiple times the block length (m)*(l). For example, the partition may comprise 4 blocks (m) and have a total length (k) of 4*32 bytes=128 bytes.

The ECC preferably employs the identical CRC generator as employed to add the CRC to the data file, so that only a single type of CRC generator needs to be acquired, thereby leading to design simplicity.

In accordance with the present invention, the blocks of the data file and the gap blocks are supplied by memory manager 18 to the memory array 16 beginning at partition boundaries. Since all of the blocks are of identical size, including those originally of odd size which are padded to the full block size, subsequent partitions will align with the end of one block and the beginning of the next.

By aligning the blocks and partitions, no block, especially a gap block, spans a boundary partition. Thus, the ECC check symbols are calculated only from partitions having complete blocks, which may include one or more gap blocks. A header block may be subsequently substituted for a gap block without altering the CRC, which will be explained hereinafter.

In accordance with the present invention, the blocks of the data file and the associated ECC check symbols are written to different partitions of the memory array 16, located in an ECC segment. For example, the ECC may comprise 4 bytes of ECC check symbols for each 128 byte partition of data. Thus, the 128 bytes of data are written to one partition (k) of the memory array 16, and the 4 bytes of ECC check symbols are written into a different memory segment of the memory array 16 by memory manager 18 and segment handler 19, occupying 4 bytes of the "ECC" segment. The additional 4 bytes of ECC therefore requires 3.125% overhead of the memory array, while saving the need for a separate DRAM and data handling circuitry.

In one embodiment, the memory manager 18 supplies the Reed-Solomon check symbols for each partition to the memory array 16 at an ECC segment at a predetermined offset from the data block partitions. For example, the data block partitions may be at the low order addresses of the memory array, and the ECC segment may be at the high order addresses of the memory array. The ECC check symbols are stored in sequentially incremented locations in the ECC segment. The addressing for the memory manager 18 then becomes simple to implement, as will be explained hereinafter.

Data or information to be stored on data storage media such as optical disk or on magnetic tape requires the addition of headers or information defining the data or information and its method of recording (e.g., the compression code) so that it can be identified and, hopefully, read at a later date. Conventionally, such headers are of a defined length and are appended at the beginning of each compressed data file. For example, in a standard format for the IBM 3494 Data Storage Library, there is a 96 byte device block header, which is composed of three separate 32 byte fields, each of which has as its last 4 bytes the CRC bytes of the 28 bytes of header data which precede it. In accordance with one embodiment of the present invention, the header blocks are therefore of formatted block length (l). The data file, and all succeeding data files, are preceded by a single data file header of formatted block length (l) of 32 bytes, including the 4 byte CRC. The CRC is preferably of the same polynomial as that of the data file CRC.

Conventionally, the header information is provided by a microprocessor 28, which may comprise microcode of the same processor utilized for the SCSI controller 22 and memory manager 18, or may comprise a separate library or storage management processor.

In accordance with one embodiment of the present invention, the header information from microprocessor 28 is supplied to the memory array separately from the data blocks. As described above, to accommodate the headers, data block formatter 26, while formatting the received compressed data files, provides a gap block to accommodate each of the header blocks. The gap blocks are of block format length (l), and the ECC encoding logic 20 processes zeros for each gap block. In accordance with one embodiment of the invention, the ECC encoding logic 20 processes the gap block by fast forward calculation, which can occur via clocking, while processing the partition in which the gap block is located.

The headers supplied by microprocessor 28 are provided at microprocessor interface 29 and supplied to register bank 30. CRC generator 31 appends the same CRC as for the data file to the header information to form a completed header in the block format of block length (l).

The microcode then initiates the transfer of the completed header to memory manager 18 for insertion into memory array 16 to overlay the gap block formed when the associated data file was stored as a string of data blocks for the data file.

In accordance with the present invention, the CRC added to the header information and included in the header block will not alter the ECC check symbol calculation so long as the CRC and ECC check symbol calculations use the same polynomial, and so long as the block for calculating the CRC is entirely contained within a given partition (k). By employing the same polynomial for the CRC and the ECC, the 4 byte CRC added to the 28 byte header will appear the same as 32 bytes of zero to the ECC. Thus, the header and CRC, on net, contribute nothing to the ECC. The header with CRC in a 32 byte block may therefore be substituted for the 32 byte gap block in a partition without altering the ECC for the partition.

To insure that no header block with the associated CRC spans multiple partitions, segment handler 19 starts the first data file exactly at a partition boundary, or at an integer number of block lengths after it, (with the device block gaps) of memory array 16. The compressed data is formatted into blocks by data block formatter 26 and memory manager 18 stores the formatted blocks in partitions in the memory array 16, with the last block padded to exactly the full block length (l). All following data files are separated by gap blocks of exactly the full block length (l), with the result that all data files and associated gaps and headers are encompassed in blocks of length (l), allowing the partitions (k) to lie on block boundaries. The ECC calculations on the partitions are therefore exactly based on the partitions without risk of an encompassed subsequently added header crossing any of the partition boundaries.

When data is read out of the memory array 16, ECC syndromes are calculated by syndrome generators which read both the data and the associated ECC check symbols. In the embodiment illustrated in FIG. 1, the data is first read out sequentially and a partial syndrome is created by ECC syndrome calculator 32, which is transferred to a syndrome register 33 in syndrome calculator 34. Then, the ECC check symbols associated with the data are read out from the different segment of the memory array 16 and passed through the second syndrome calculator 34. The syndromes should then all be zero. If they are not, a DRAM error has occurred, and the microprocessor 28 will then conduct an error recovery procedure.

The compressed, formatted block data files are then transmitted across bi-directional interface 35 to the data storage system 14.

As an example, the byte level ECC polynomial which may be implemented in the present invention may have a Galois field definition $(GF(2^8))$, with a calculation performed over 128 data bytes (a partition (k)) to form 4 check bytes. The ECC is thus a Reed-Solomon (132,128) polynomial using alpha terms 126, 127, 128, and 129, which are the same alpha terms used by the CRC. This allows correction of any one byte in error, detection of two or three bytes in error with a probability of error (Pe) of 0, and detection of four or more bytes in error with very high confidence ($\frac{1}{2}^{17}$).

The data flow of an embodiment of the present invention will be explained in detail. Four relevant data flow processes will be described. Briefly the data flow processes are 1) building a packet entity in memory array 16 before a write operation (SCSI to DRAM); 2) reading out of memory array 16 into the write data flow logic (DRAM to data storage); 3) writing into memory array 16 from the read data flow logic (data storage to DRAM); and 4) extraction of a data file from the packet entity and reading it out (DRAM to SCSI). ECC check syndromes are created when data is written into the memory array 16, and they are checked when data is read out of the memory array.

Referring to FIG. 1, the data flow for building a packet in memory array 16 for a future write to data storage will be described.

A packet entity is built by first leaving a 96 byte gap for the device block header, and then a 32 byte gap for the first file header, each of which will be filled in later by microprocessor 28. Then, the data as received from host 12 is compressed by data compressor 23, and written out to the memory array 16. Between the compressor 23 and the memory array 16 is data block formatter 26 which formats the gaps and data into blocks and provides any necessary padding to the data and appends the CRC.

Memory manager 18 and segment handler 19 start the first data file exactly at a 128 byte partition boundary with the gap blocks which will later be filled in with the headers. The block formatted compressed data is written into memory array 16 as a sequential series of blocks. The data formatter 26 pads the last block of the data file so that, after the CRC is added, it is of length (l). CRC generator 27 appends the CRC at the end of the compressed data file. Then, memory manager 18 supplies the block to the memory array. Another 32 byte gap (for the second file header) is added and the second data file is then compressed and written out to memory array 16.

As the second data file is being written to the memory array 16, the microprocessor 28 creates the 28 bytes of the file header for the first data file and the header with the 4 associated CRC bytes are provided by register 30 and CRC generator 31 and written by memory manager 18 to the memory array 16 at the gap block in the address space that was left for it. The 28 byte register bank 30 may actually be located within the memory manager or within the microprocessor interface 29, or the bytes could be built in external storage (e.g., SRAM) by the microporcessor 28 and passed in sequentially to the CRC circuit, but for the purpose of illustration is shown separately. The 96 byte device block header may be written using the same register bank 30 since the header is composed of three 32 byte fields which each also comprise 28 bytes followed by a 4 byte CRC. The microprocessor 28 then writes the header address register with the address to which the header data is to be written to, and then initiates the transfer to the memory array partition. The actual transfer to the memory array 16 is handled by the memory manager 18 which is time slice multiplexed to deal with different tasks simultaneously to different memory array partitions. As described above, the 32 byte file header will always start and end at a memory partition boundary or at 32*n bytes into it. Because it is only 32 bytes long, this means that it will never span a memory partition boundary.

The ECC bytes are generated by a third CRC circuit 20, identical but separate from the CRC circuit 27 for appending the CRC to the compressed data and from the CRC circuit 31 for appending the CRC to the headers. Any of many CRC circuits and Reed-Solomon algorithms may be utilized, as may any of many polynomials. The preferred CRC is that utilized as the standard for the data storage system 14 to which the memory system 10 is attached. In accordance with an embodiment of the present invention, the CRC is started so that any previous residue is forgotten, as will be explained hereinafter. In the illustrated example, the above byte level ECC polynomial is used which has a Galois field definition ($GF(2^8)$), with a calculation of 128 bytes (a partition (k)) to form 4 check bytes. The ECC is a Reed-Solomon (132,128) code using alpha terms 126, 127, 128, and 129, which are the same alpha terms used by the CRC. Specifically, after the first 128 data bytes of the first data file, a memory partition boundary is reached. At this point, the ECC check symbols comprising the state of the CRC generator 20 are transferred to the 4 byte register bank 21 and the CRC circuit receives the 129th byte as if it were the first (i.e., it does not carry forward the residue from the previous bytes). The four byte register bank 21 is actually within the memory manager and when the ECC check symbols are written, the memory manager is enabled to store them to the ECC segment of memory array 16.

In accordance with an embodiment of the present invention, the ECC Reed-Solomon check symbols for each partition are stored to the memory array 16 to the ECC segment at a predetermined offset from the data block partitions, and in sequentially incremented locations. Since the ECC check symbols are $\frac{1}{32}$ the length of the data partitions for which they are calculated ($4(=2^2)$ ECC bytes for every 128 ($=2^7$) data bytes), the incrementing offsets within the ECC segment for each set of ECC check symbols is the base address of the associated memory partition shifted by 5 bits. For example, if the data partition portion of the memory array is located at 00000-7FFFF (in hex), the first partition containing data blocks is from 00080-000FF (in hex), the corresponding location in the ECC segment (from the base address of the ECC segment which is an offset from the data partitions) is 0004-0007 (in hex). If, for example, the offset base address of the ECC segment is 80000 (in hex), then the ECC for the data partition at 00080-000FF is at 80004-80007. Thus, if the data partition is the $2^{19}$ address space described above, the ECC segment requires only a $2^{14}$ address space from 80000-83FFF. The $\frac{1}{32}$ ratio also applies to the relative amount of memory array bandwidth used to store ECC check symbols.

If the first data file is 160 bytes long in total after padding and including the CRC, with the first 128 bytes stored to the second memory array partition, the last 32 bytes are stored into the next (third) memory partition. At this point, a gap block of 32 bytes is left for the second file header, and then the second data file is stored.

The gap block entry may be an automated entry, but the ECC bytes in the generator circuit 20 were calculated on the data bytes written to the first 32 bytes only, and cannot be used unaltered starting at byte 64. The ECC bytes may be advanced by processing the 32 gap bytes of zero, or instead, by fast forwarding the generator circuit in a single cycle via calculation as an alternative to clocking. With a four byte wide data path, 32 bytes of zeros only requires 8 clocks. This causes the residue bytes to be those which would have been calculated had the first data file been 32 bytes of zero longer.

Next, the first 64 bytes of the second data file are passed through the ECC generator circuit 20 and the four bytes of the ECC stored for this memory partition will represent the 128 bytes of the data partition read contiguously after the header is installed (again, this requires that the same CRC generator be employed both for the header CRC and for the ECC). When the third data file is being transferred, the microprocessor 28 will write the second file header into the gap block left open for it Because the header terminates with a four byte CRC which has the same alpha terms as the RS (132,128) code being used for the ECC, the header will give no contribution to the ECC bytes (e.g., if four headers were stored end to end in a memory partition, and passed through the ECC generator circuit 20 on the way, they would generate four ECC bytes which are identically "00"). Because cyclic codes are linear, this means that the ECC bytes calculated for the third memory array partition (which had assumed that the 32 bytes to be used for the header are all "00"), are the same ones which should now be calculated on all 128 bytes of the memory partition (including the header which includes its CRC).

Clearly, the headers, including their CRC fields, must not cross the partition boundaries, and the ECC's must begin calculation anew at the partition boundaries.

Referring to FIG. 1, the data flow for reading out of memory array 16 into the write data flow logic for writing to data storage 14 will be described.

In this case, the whole packet is read out contiguously. This is handled by the memory manager 18 in a DMA (Direct Memory Access) type of mode. On read out, no distinction is made between data elements within the packet (header or data file), it is just a block of memory to be transferred at a speed determined by the write channel. The ECC calculator 32 is a syndrome generator for each alpha term (four). An example of specific circuitry will be shown hereinafter. The packet is read out of memory array 16 starting at the beginning of the first partition, and the syndrome generators 32 are zeroed before the read out begins. When the last byte of each partition is read out, the partial syndrome calculation is passed to an identical but separate circuit, the finishing circuit 34, and the syndrome generator 32 begins anew on the first byte of the next partition. The finishing circuit then passes the four ECC bytes, which correspond to the memory segment just read, through (this is because the ECC bytes are read from the ECC segment of the memory array 16 by the memory manager 18 and stored in register 33 in tandem with the data bytes from the memory partitions of the data segment). At this point, the syndromes should all be identically zero (if there were no DRAM errors). If they are all zero, no action is taken and the transfer continues. If one or more syndromes is non-zero, an interrupt is generated, the transfer discontinued, and the microprocessor must perform an ERP (error recovery procedure), the first step of which will be to read out all four syndromes and the offset within the ECC memory partition from the finishing circuit (transferred to the finishing circuit when the four ECC data bytes are transferred). The syndromes are input to the ECC calculation routine, which is described in more detail hereinafter, and give one of two possible results. One result is that the syndromes indicate that only a single byte is in error (generally speaking, the failure mechanisms within DRAMs mean that it is likely that only a single bit is in error within this byte), and then the location and value of the error are calculated, to allow the microprocessor 28 to restore the DRAM location to its correct value. The other result is that the syndromes indicate that more than one byte is in error and some type of error signal is generated to the host 12 to re-transmit the associated data file because it has been irretrievably corrupted (this situation should never occur).

Thus, the generation of an interrupt, if one or more syndromes is non-zero, halts the data transfer before additional data is clocked (to prevent corruption of the syndromes) and before the DRAM pointer is lost. This enables correction of the DRAM.

Referring to FIG. 1, the data flow for writing into memory array 16 from the read data flow logic for reading from data storage 14 will be described.

This is comparable to writing into the data storage 14, but in reverse. The entire packet is read in to occupy a contiguous set of memory partitions and no distinction is made between data elements within the packet (header or data file), it is just a block of memory to be transferred at a speed determined by the read channel. The data is placed into the memory array 16 in the data segment beginning at a partition boundary determined by memory manager 18. The CRC generator circuit 20 is zeroed before data transfer begins. When the last data byte of each partition is transferred in, the residue contained in the generator circuit is passed to the four byte register bank 21 in the memory manager 18, and it is written out to the associated ECC location in the ECC segment of memory array 16.

Referring to FIG. 1, the data flow for extracting the requested data file from memory array 16 to be read to the SCSI 22 and transmitted to the host 12 will be described.

The system architecture of the conventional data storage system will determine the specifics of the extraction data flow process. As an example, the system may call for all of the files in the packet to read out through the SCSI 22. Once the packet has been transferred into memory array 16, the device header is read by the microprocessor 28. This read may be performed as three separate DMA-like transfers between the DRAM and the 28 byte register bank used to write the device block header. All 32 bytes of each 32 byte element of the device block header are passed through the CRC generator, which is now used as a CRC checker, but the last four bytes need not be saved into the register bank. Once this transfer is complete, the residue in the CRC checker should be zero. In the given case of a 96 byte device header with a trailing CRC, its contribution to the ECC bytes for the 128 byte partition will be zero. This is also true for the first file header, which may complete a 128 byte partition.

The first data file begins at a partition boundary. If the first data file happened to be 128 bytes long, it would exactly span one partition. When this file is read, because the transfer began and ended on partition boundaries, the partial syndromes of the ECC syndrome generator 32 are transferred to the finishing circuit 34 which will then pass the four associated ECC bytes from the associated ECC segment, at register 33, through and generate the syndromes which should be identically zero. If not, an error has occurred and the microprocessor will invoke the Error Recovery Procedure, ERP, to correct it.

After the first data file was transferred out to the SCSI 22 to the host 12, the file header for the second data file is read. When this has been completed, the syndrome generator has partial syndromes from 32 bytes of information. But, since these 32 bytes end with four CRC bytes, the partial syndromes should be identically zero. If not, an error has occurred, so the microprocessor 28 determines whether the syndrome circuit contains all zeros. If not, an ERP must be invoked. The microprocessor may read the syndromes from the syndrome circuit 32 directly so that correction could be performed. Alternatively, a transfer to the finishing circuit 34 could be forced to allow reading of the syndromes. Usually, no error is found in the file header, and the second file begins transferring to the SCSI 22 (through the decompression logic 23). Aside from the headers, the data file syndromes are calculated in the fashion of the read out to the data storage system, described above.

Figure 2:
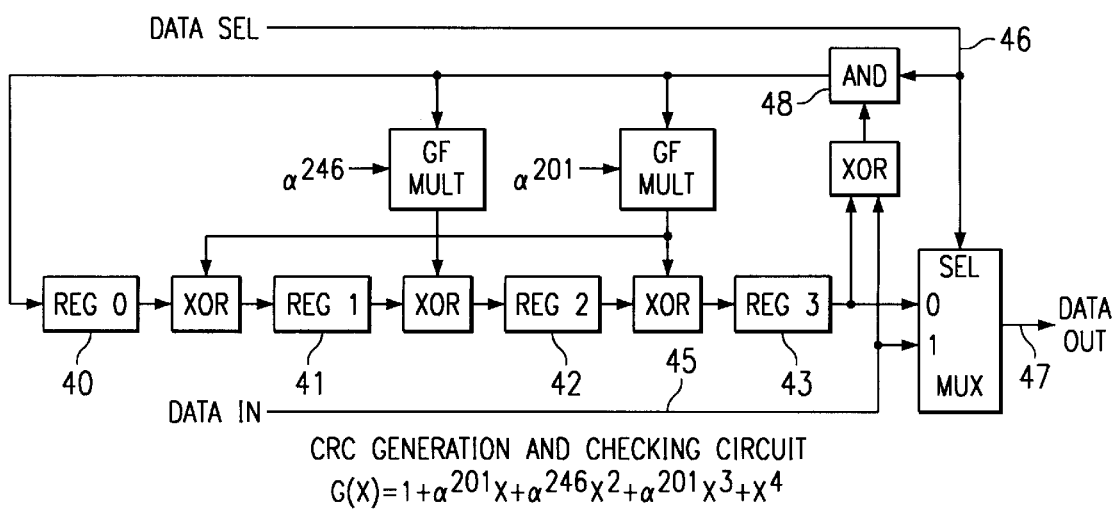
FIG. 2 is a block diagram of an exemplary byte wide Reed-Solomon check symbol generator.
Figure 3:
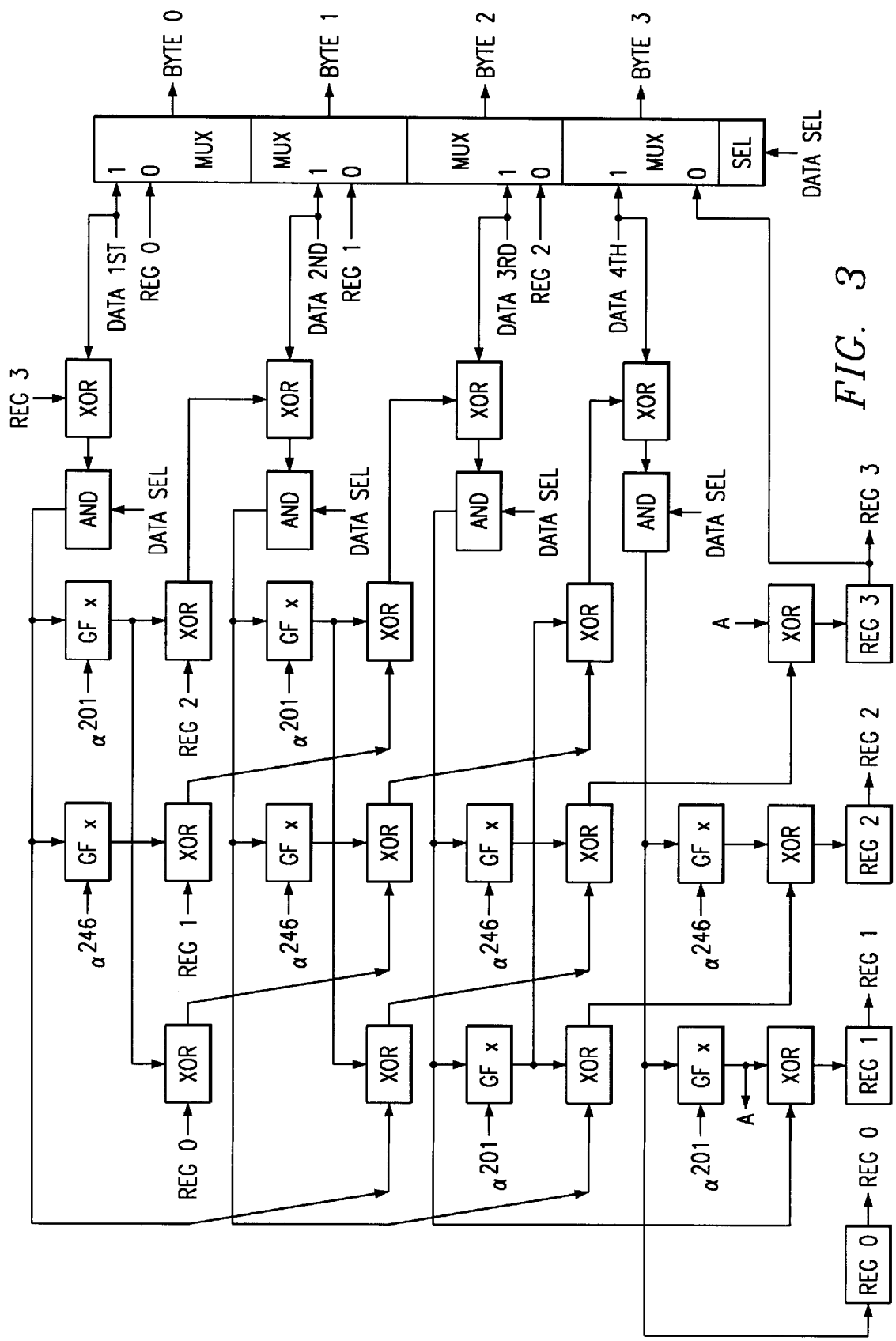
FIG. 3 is a block diagram of the check symbol generator of FIG. 2 extended to a four byte wide data flow path which may be employed with the memory system of FIG. 1.

Reed-Solomon CRC generation and syndrome calculation are well known. A description of Reed-Solomon generation and syndrome calculation may be found, for example, in "Error Control Coding: Fundamentals and Applications", Lin and Costello, Prentice-Hall, Inc., 1983, pp. 171–176. Many specific Reed-Solomon arrangements and polynomials may be used to implement the CRC and ECC generators 20, 27, and 31 employed in the present invention. An example of an implementation of a byte wide CRC generator circuit is shown in FIG. 2. The registers 40–43 all begin reset, all the data bytes over which the CRC is to be generated are clocked into the CRC circuit at line 45, and the data select line 46 is held active. Then, data select line 46 is made inactive and four more clocks transfer the CRC bytes out at line 47. An AND 48, is degated by line 46 to prevent feedback during these four clock cycles, so the four registers 40–43 become identically zero at the end of the fourth cycle, thus resetting itself for the data which follows. This allows seamless CRC appending (no clock cycle is lost to synchronously reset the registers). FIG. 3 illustrates the circuit of FIG. 2 extended to a four byte wide data flow path.

Figure 4:
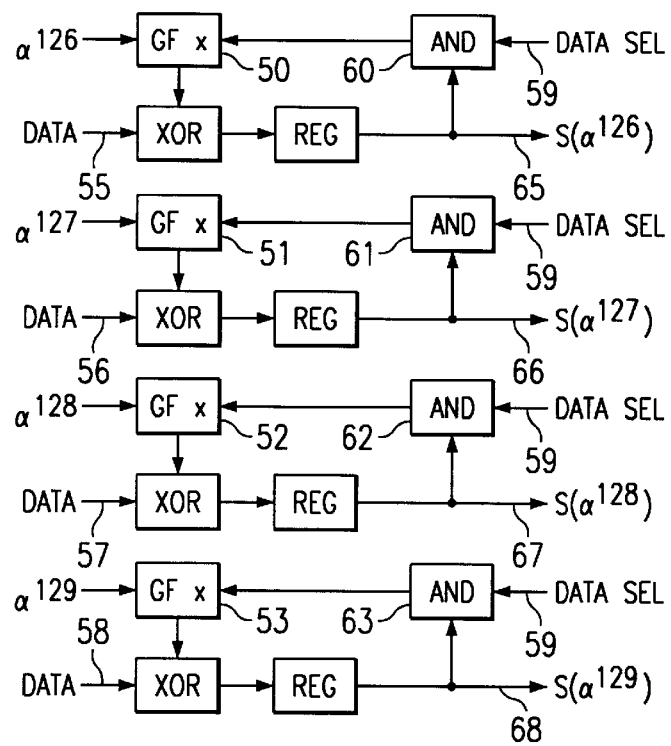
FIG. 4 is a block diagram of exemplary four ECC syndrome calculators.
Figure 5:
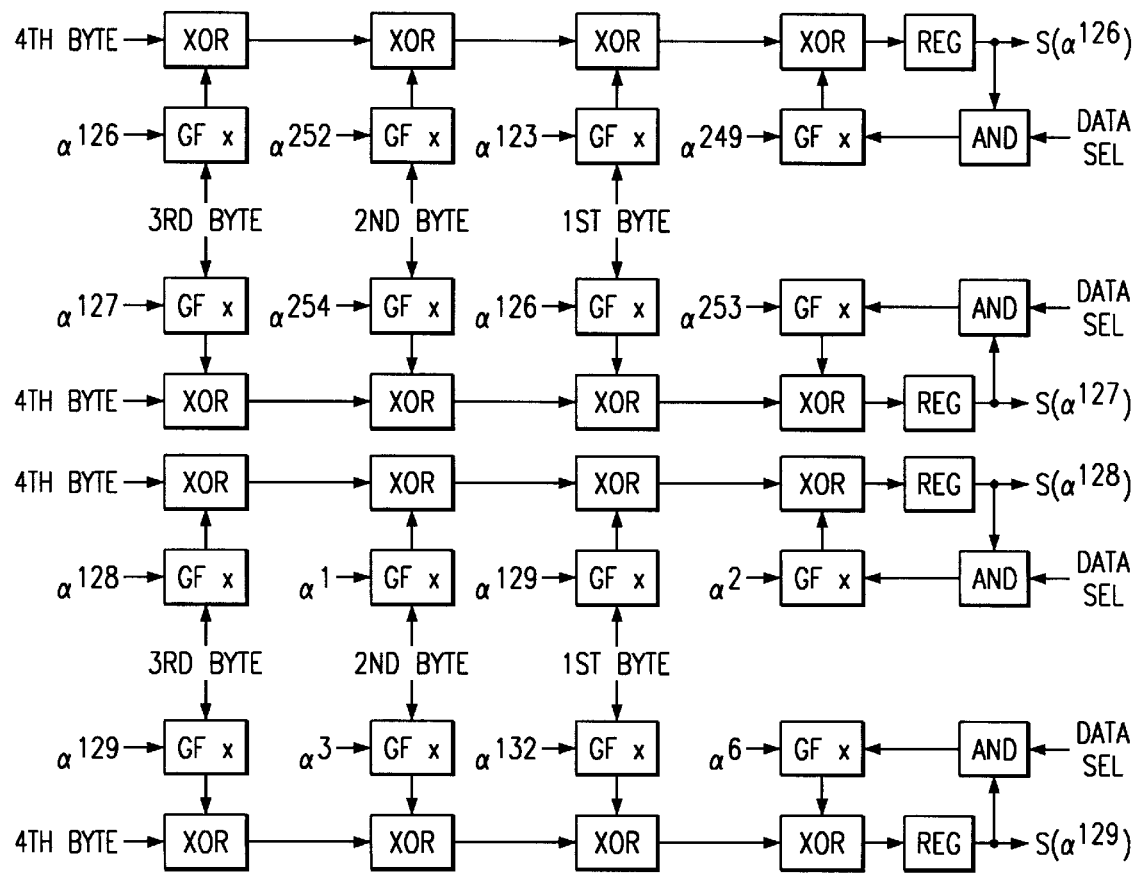
FIG. 5 is a block diagram of the ECC syndrome calculators of FIG. 4 extended to a four byte wide data flow path, which may be employed with the memory system of FIG. 1.

Many specific arrangements may be used to implement the ECC syndrome calculator 32 employed in the present invention. An example of an implementation of the four syndrome calculators for byte wide ECC circuit is shown in FIG. 4. The four alpha calculators 50–53 calculate, respectively, alpha to the 126, 127, 128, or 129. The data are received at inputs 55–58. The data select input 59 is held inactive during the one cycle that the first data byte is applied to the input to degate the respective AND 60–63, to prevent feedback and thereby clear the effect of all data bytes which precede it. The syndrome output at lines 65–68 is valid for all the preceding data at the same clock cycle, so activating data select line 59 also indicates when to latch the syndrome output to the circuit following the syndrome calculator. FIG. 5 illustrates the circuit of FIG. 4 extended to a four byte wide data flow path.

While the preferred embodiments of the present invention have been illustrated in detail, it should be apparent that modifications and adaptations to those embodiments may occur to one skilled in the art without departing from the scope of the present invention as set forth in the following claims.

We claim:

1. A memory system for storing data having subsequent insertion of content, said inserted content having first check symbols calculated from said content with a Reed-Solomon generator polynomial, comprising:

a memory array having a predefined access width (w);

an input for receiving data;

a data block formatter coupled to said input for arranging said data in a block format, each block of length (l) directly related to said predefined access width (w), and for adding at least one gap block of length (l) to said data for subsequent insertion of said content with said check symbols substituting for said gap blocks;

ECC encoding logic coupled to said data block formatter for calculating ECC Reed-Solomon check symbols, employing an identical Reed-Solomon generator polynomial as said first check symbols, for said block format data for a partition comprising a multiple (m) of said blocks, the length of said partition (k) equaling said multiple times said block length (m)*(l); and a memory input device coupled to said memory array, to said data block formatter, to said ECC encoding logic, and to said input for supplying said data blocks to said memory array in a sequence of blocks with no said gap block spanning a partition boundary, for supplying said ECC Reed-Solomon check symbols to said memory array separately from said blocks, and for subsequently substituting for each said gap block a block of said inserted content with said first check symbols, whereby said inserted content and first check symbols provide no net contribution to said ECC.

2. The memory system of claim 1, wherein said memory input device supplies said ECC Reed-Solomon check symbols for each partition to said memory array at predetermined offset from said data block partitions, and in sequentially incremented locations.

3. The memory system of claim 1, wherein said received data comprises at least one data file, and said inserted content comprises at least one header for each said data file, said header arranged in said block format with said first Reed-Solomon check symbols appended to said header in each said block, and wherein said memory input device supplies at least one said gap block preceding said data blocks of said data file for subsequent substitution of said at least one header.

4. The memory system of claim 3, wherein said data block formatter pads each of said received data files, if needed, to terminate at a boundary of said blocks of total block length (l), and wherein said memory input device supplies said data blocks for said data files in a sequence of complete blocks.

5. The memory system of claim 4, wherein said memory input device supplies the one of said gap blocks for the first of said data files at a boundary of, or at an integral number of blocks into, said partitions.

6. The memory system of claim 1, wherein said data block formatter provided at least one gap block of said block format length (l) comprises a block of zeros, and wherein said ECC encoding logic processes zeros for said gap block.

7. The memory system of claim 6, wherein said ECC encoding logic processes said gap block by fast forward calculation.

8. The memory system of claim 1, additionally comprising:

an output device coupled to said memory array for reading said data and said inserted blocks of at least one of said data files, and for reading said ECC Reed-Solomon check symbols associated with said read data and inserted blocks; and error detection and correction logic coupled to said output device for calculating Reed-Solomon syndromes as a function of said read data blocks and of said read associated ECC Reed-Solomon check symbols, for detecting certain of errors therein and halting said output device to enable correction of said errors.

9. The memory system of claim 8, wherein said error detection and correction logic calculates said syndromes for each said read partition of multiple blocks, employing said read associated ECC Reed-Solomon check symbols for said partition.

10. A temporary storage memory system for storing data files transferred between a host computer system and a data storage system, said data files having an initially supplied stream of data and having at least one subsequently supplied header, said header including first check symbols calculated from said header with a Reed-Solomon generator polynomial and arranged in a block format of length (l), said temporary storage memory system comprising:

a memory array having a predefined access width (w) directly related to said block length (l);

at least one input for receiving said data and for receiving said header;

a data block formatter coupled to said data input for arranging said data in said block format, each block of length (l), and for adding at least one gap block of length (l) to said data for subsequent insertion of said header block substituting for said gap block;

ECC encoding logic coupled to said data block formatter for calculating ECC check symbols, employing an identical Reed-Solomon generator polynomial as said first check symbols, for said block format data for a partition comprising a multiple (m) of said blocks, the length of said partition (k) equaling said multiple times said block length (m)*(l); and a memory input device coupled to said memory array, to said data block formatter, to said ECC encoding logic, and to said header input for supplying said data blocks to said memory array in a sequence of blocks, said sequence of blocks stored in said memory array beginning at a boundary defining a partition so that no said gap block spans a partition boundary, for supplying said ECC Reed-Solomon check symbols to said memory array separately from said blocks, and for subsequently substituting for each said gap block a header block with said included first check symbols, whereby said header block provides no net contribution to said ECC.

11. The temporary storage memory system of claim 10, wherein said memory input device supplies said ECC Reed-Solomon check symbols for each partition to said memory array at predetermined offset from said data block partitions, and in sequentially incremented locations.

12. The temporary storage memory system of claim 10, wherein said data block formatter pads each of said received data files, if needed, to terminate at a boundary of said blocks of total block length (l), and wherein said memory input device supplies said data blocks for said data files in a sequence of complete blocks, and in alignment with said partition boundaries.

13. The temporary storage memory system of claim 10, wherein said data block formatter provided at least one gap block of said block format length (l) comprises zeros, and wherein said ECC encoding logic processes zeros for said gap block.

14. The temporary storage memory system of claim 13, wherein said ECC encoding logic processes said gap block by fast forward calculation.

15. The temporary storage memory system of claim 10, additionally comprising:

an output device coupled to said memory array for reading said data blocks of at least one of said data files, and for reading said ECC Reed-Solomon check symbols associated with said read data blocks; and error detection and correction logic coupled to said output device for calculating Reed-Solomon syndromes as a function of said read data blocks and of said read associated ECC Reed-Solomon check symbols, for detecting certain of errors therein and halting said output device to enable correction of said errors.

16. The temporary storage memory system of claim 15, wherein said error detection and correction logic calculates said syndromes for each said read partition of multiple blocks, employing said read associated ECC Reed-Solomon check symbols for said partition.

17. A method for storing initially received data and subsequently received content to be added to said data, said content having appended first check symbols calculated from said content with a Reed-Solomon generator polynomial and formatted into blocks of length (l), in a memory system having a memory array of a predefined access width (w) directly related to said block length (l), comprising the steps of:

formatting said received data in said block format, each block having a length (l);

supplying gap blocks of length (l) to said formatted data for subsequent insertion of said content blocks substituting for said gap blocks;

calculating ECC check symbols, employing an identical Reed-Solomon generator polynomial as said first check symbols, for said block format data for a partition comprising a multiple (m) of said blocks, the length of said partition (k) equaling said multiple times said block length (m)*(l);

supplying said data and said gap blocks to said memory array in a sequence of blocks beginning at a partition boundary and with no said gap block spanning a partition boundary;

supplying said ECC Reed-Solomon check symbols to said memory array separately from said data blocks; and subsequently substituting for each said gap block a block of said subsequently received content, said content block including said first check symbols, whereby said received content block provides no net contribution to said ECC.

18. The method for storing received data of claim 17, wherein said step of supplying said ECC Reed-Solomon check symbols to said memory array comprises supplying said ECC check symbols for each partition to said memory array at predetermined offset separate from said data block partitions, and in sequentially incremented locations.

19. The method for storing received data of claim 17, wherein said received data comprises at least one data file, wherein said received content comprises at least one header to be appended to each said data file, said header also arranged in said block format including said appended first Reed-Solomon check symbols, so that the length of said header block, including said appended check symbols, is identical to the length (l) of said gap block, and wherein said step of supplying said gap blocks to said formatted data additionally comprises supplying said gap block preceding said data blocks of said data file.

20. The method for storing received data of claim 19, wherein said step of formatting said received data in said block format, additionally comprises padding the last one of said blocks of a data file to a total length (l), if needed, and wherein said step of supplying said data and said gap blocks to said memory array additionally comprises supplying said data and said gap blocks for said data files in a sequence of complete blocks of length (l).

21. The method for storing received data of claim 20, wherein said step of supplying said data and said gap blocks for said data files to said memory array additionally comprises supplying one of said gap blocks for the first of said data files to said memory array beginning at a boundary of, or at an integral number of blocks into, one of said partitions.

22. The method for storing received data of claim 17, wherein said step of supplying said gap blocks comprises supplying zeros for said gap blocks of said block format length (l), and wherein said step of calculating ECC check symbols additionally comprises processing zeros for said gap block.

23. The method for storing received data of claim 22, wherein said step of calculating ECC check symbols by processing zeros for said gap block comprises fast forward processing for said gap block.

24. A method for storing initially received data and subsequently received content for said data, said content having appended first check symbols calculated from said content with a Reed-Solomon generator polynomial and formatted into blocks of length (l) in, and retrieving said data and said content from, a memory system having a memory array of a predefined access width (w) directly related to said block length (l), comprising the steps of:

formatting said received data in said block format, each block having a length (l);

supplying gap blocks of length (l) to said formatted data for subsequent insertion of said content blocks substituting for said gap blocks;

calculating ECC check symbols, employing an identical Reed-Solomon generator polynomial as said first check symbols, for said block format data for a partition comprising a multiple (m) of said blocks, the length of said partition (k) equaling said multiple times said block length (m)*(l);

supplying said data and said gap blocks to said memory array in a sequence of blocks beginning at a partition boundary and with no said gap block spanning a partition boundary;

supplying said ECC Reed-Solomon check symbols to said memory array separately from said data and said gap blocks;

subsequently substituting for each said gap block a block of said subsequently received content, said content block including said first check symbols, whereby said received content block provides no net contribution to said ECC;

reading from said memory array said data and said content blocks of at least one of said data files;

reading from said offset grouping of said memory array said ECC Reed-Solomon check symbols associated with said read data and said content blocks;

calculating Reed-Solomon syndromes as a function of said read data and said content blocks and of said read associated ECC Reed-Solomon check symbols, for detecting certain of errors therein; and halting said reading steps, upon said step of calculating Reed-Solomon syndromes detecting an error, to enable correction of said error.

25. The method for storing and retrieving received data and content of claim 24, wherein said step of calculating Reed-Solomon syndromes additionally comprises calculating said syndromes for each said read partition of multiple blocks, employing said read associated ECC Reed-Solomon check symbols for said partition.

26. A memory system, comprising:

a memory array having a predefined access width (w);

an input for receiving data;

a data block formatter coupled to said input for arranging said data in a block format, each block of length (l) directly related to said predefined access width (w);

ECC encoding logic coupled to said input for calculating check symbols, employing a Reed-Solomon generator polynomial, for said block format data for a partition comprising a multiple (m) of said blocks, the length of said partition (k) equaling said multiple times said block length (m)*(l); and a memory input device coupled to said memory array, to said input, and to said ECC encoding logic for supplying said data blocks to said memory array in a sequence of blocks, and for supplying said Reed-Solomon check symbols to said memory array separately from said data blocks, said memory input device supplying said Reed-Solomon check symbols for each partition to said memory array at predetermined offset from said data block partitions, and in sequentially incremented locations.

27. The memory system of claim 26, wherein said data block formatter pads each of said received data files, if needed, to terminate at a boundary of said blocks, and wherein said memory input device supplies said data blocks for said data files in a sequence of complete blocks of length (l) beginning at a partition boundary, whereby said Reed-Solomon check symbols are calculated for partitions of complete blocks.

28. The memory system of claim 26, additionally comprising:

an output device coupled to said memory array for reading said data blocks of at least one of said data files, and for reading said Reed-Solomon check symbols associated with said read data blocks from said predetermined offset and sequentially incremented locations; and error detection and correction logic coupled to said output device for calculating Reed-Solomon syndromes as a function of said read data blocks and of said read associated Reed-Solomon check symbols, for detecting certain of errors therein and halting said output device to enable correction of said errors.

29. The memory system of claim 28, wherein said error detection and correction logic calculates said syndromes for each said read partition of multiple blocks, employing said read associated Reed-Solomon check symbols for said partition.

30. A method for storing received data in a memory system having a memory array of a predefined access width (w), comprising the steps of:

formatting said received data in a block format, each block having a length (l) directly related to said predefined access width (w);

calculating check symbols, employing a Reed-Solomon generator polynomial, for said block format data for a partition comprising a multiple (m) of said blocks, the length of said partition (k) equaling said multiple times said block length (m)*(l);

supplying said data blocks to said memory array in a sequence of blocks; and supplying said Reed-Solomon check symbols for each partition to said memory array at predetermined offset from said data block partitions, and in sequentially incremented locations.

31. The method for storing received data of claim 30, wherein said step of formatting said received data in a block format, additionally comprises padding each of said received data files, if needed, to terminate at a boundary of said blocks, and wherein said step of supplying said data blocks to said memory array additionally comprises supplying said data blocks for said data files in a sequence of complete blocks of length (l) beginning at a partition boundary, whereby said Reed-Solomon check symbols are calculated for partitions of complete blocks.

32. A method for storing received data in, and retrieving said data from, a memory system having a memory array of a predefined access width (w), comprising the steps of:

formatting said received data in a block format, each block having a length (l) directly related to said predefined access width (w);

calculating check symbols, employing a Reed-Solomon generator polynomial, for said block format data for a partition comprising a multiple (m) of said blocks, the length of said partition (k) equaling said multiple times said block length (m)*(l);

supplying said data blocks to said memory array in a sequence of blocks; and supplying said Reed-Solomon check symbols for each partition to said memory array at predetermined offset from said data block partitions, and in sequentially incremented locations;

reading from said memory array said data blocks of at least one of said data files;

reading said Reed-Solomon check symbols associated with said read data blocks from said predetermined offset and sequentially incremented locations; and calculating Reed-Solomon syndromes as a function of said read data blocks and of said read associated Reed-Solomon check symbols, for detecting and correcting certain of errors therein.

33. The method for storing received data of claim 32, wherein said step of calculating Reed-Solomon syndromes additionally comprises calculating said syndromes for each said read partition of multiple blocks, employing said read associated Reed-Solomon check symbols for said partition.

* * * * *